United States Patent [19]

Randolph

[11] 4,141,246
[45] Feb. 27, 1979

[54] PRIMARY FLOW SENSING DEVICE
[76] Inventor: Ellwood A. Randolph, P.O. Box 15432, Baton Rouge, La. 70895
[21] Appl. No.: 816,894
[22] Filed: Jul. 18, 1977
[51] Int. Cl.² ............................................. G01F 1/20
[52] U.S. Cl. ............................. 73/194 B; 73/DIG. 1
[58] Field of Search ........ 73/194 B, 194 VS, DIG. 1; 179/109, 113, 115.5 R, 121 R

[56] References Cited
U.S. PATENT DOCUMENTS

| | | | |
|---|---|---|---|
| 1,789,192 | 1/1931 | Richards | 179/109 X |
| 2,063,944 | 12/1936 | Pierce | 179/109 X |
| 2,809,520 | 10/1957 | Richard | 73/194 VS |
| 3,878,716 | 4/1975 | Asada | 73/194 VS |

FOREIGN PATENT DOCUMENTS 459672  3/1975  U.S.S.R. ............................. 73/194 VS

Primary Examiner—James J. Gill
Attorney, Agent, or Firm—Llewellyn A. Proctor

[57] ABSTRACT

A primary sensing device, or apparatus, for measuring energy level changes, or variations, in a medium capable of transmitting energy. An elongated reed, the ends of which are tensioned upon suitable support means, is acted upon by the energy level changes, or variations, within the medium and energy is absorbed by the reed which causes the latter to resonate in a harmonic mode to produce nodes and antinodes in known relation to the amount of energy transmitted thereto by the medium and absorbed by said reed. An output signal, suitably as produced by one or a plurality of strain gauges, is taken off from the resonating reed, and interpreted via suitable read-out means as an intelligible signal indicative of the change in magnitude of the variable property measured within the medium.

A preferred primary sensing device is one wherein a plurality of strain gauges are located upon said elongated reed, spaced apart and substantially equidistant one gauge from another, and leads are associated with each of said strain gauges for providing an electrical input, and voltage output which is proportional to the magnitude of the wave energy transmitted to said elongated reed, and to the magnitude of the change which occurs in said medium.

12 Claims, 5 Drawing Figures

PRIMARY FLOW SENSING DEVICE

Industrial operations depend on the measurement and control of process variables, and instrumentation has become an integral and essential part of industrial processes. Any instrument, whether used for measurement or for both measurement and control, includes a primary sensing device, or element for detecting changes, or variations, in the magnitude of the controlled variable as well as means for transmitting and measuring the signals that are produced.

Most forms of energy are transmitted by waves, or wave motions. Wave actions are of many kinds, and they are of common occurrence. Distortional waves surge to and fro within vibrating bodies, and electromagnetic waves transmit radio programs, light and x-rays. Waves are commonly propagated within fluids. Sound waves thus carry tones and noises through the air, and wave actions, such as are readily visually observed in liquids, notably water, are capable of transmitting tremendous forces. Wave energy, or energy capable of being transformed into wave motions, is, e.g., usually present in media which must be measured, or measured and controlled, in most industrial operations; though most forms of instrumentation are not provided with primary sensing devices designed to directly detect changes, or variations, in this form of transmitted energy.

In the process industries, e.g., fluids as liquids, vapors and gases must be moved, or transferred, from one zone to another. Thus, the most important of the unit operations involves flow processes, in part because materials are transported in the form of fluids whenever possible. In such operations fluids pour into, through, and out of pieces of equipment. The rates of flow essentially always vary from one location in a system to another, the steady state operation being an ideal or assumed relation which rarely, if ever, exists over a finite period of time. It is nonetheless essential to know the amount of material entering and leaving a process unit, and hence it is necessary to measure the rates of flow of fluids through various conduits, weirs, or channels.

Conventional instruments for the measurement of flow rates generally require pressure differential meters, or meters which measure pressure differentials brought about by a constant area cross-section reduction of a flowing stream, e.g., as by use of a venturi meter, orifice meter, flow nozzle, pitot tube, or the like; area meters such as rotometers, weirs and the like wherein the are through which the fluid flows varies with flow rate; current meters or meters such as cup meters, propellar meters or the like which measure velocities; positive-displacement meters such as disk-meters, piston meters, rotary meters, diaphragm meters and the like wherein the quantity of fluid flowing is trapped, measured and discharged; dilution devices for measuring mass transfer as used in the paper industry; and direct weighing (or pressure measuring) devices, of which the strain gauge, often used as a load cell, or transducer, is illustrative. In the load cell the exerted force is detected and measured, the force representing the weight of an object. The detected force is translated into a voltage, the magnitude of which varies directly with the applied load and, as such, can be measured and related to the applied load.

Despite the great ingenuity evidenced by the design and operation of such instruments there is yet a need for new and improved means for the measurement, or measurement and control, of various media, particularly for the measurement, and control, of media which are capable of transmitting energy in the form of wave actions.

It is, accordingly, a basic objective of the present invention to supply this need, particularly by providing a new and novel primary sensing device, or apparatus, which varies as a function of the change, or changes, in magnitude of a condition in the media being sensed, and more particularly to provide a device capable of converting such change, or changes, of condition into a signal proportional to the magnitude of the change, or changes, of condition in the media being sensed.

A particular object of this invention is to provide such device which is sensitive to changes in various wave actions in a medium, particularly to a device which is sensitive to the rate, or changes in the rate, of flow of fluids.

A particular object is to provide a primary sensing device which can detect a change in a sensed medium, which change can be converted into an electrical signal, or voltage, the magnitude of which is directly related to such change, or rate of change, particularly as occurs in fluid flow media.

A further object is to provide a sensing device of such character for converting a condition, or change in condition, particularly as regards a rate, or change in rate of flow of a fluid, into a wave motion proportional to such condition, or change in condition, which in turn can be converted into an output voltage proportional in magnitude to the wave input.

These objects and others are achieved in accordance with the present invention which embodies a primarily sensing apparatus, or device, comprised of an elongated string, band or reed which carries one, or a plurality of strain gauges spaced apart one from another, the ends of the reed being affixed and held in tension upon a support means so that the reed, when the apparatus is placed within a medium subject to energy level variations which are to be measured, can be vibrated by the energy transmitted to the reed in a harmonic mode to produce nodes and antinodes in known relation to the amount of energy absorbed by the reed to produce such stimulation, or vibration. The apparatus includes a take-off means, or means for the receipt and transmission of a signal from said elongated reed when it is resonated, and a read-out means for relating and interpreting the output signal in direct relation to the stimulator, or change in magnitude of the stimulation produced by the energy absorbed by the reed from said medium.

In a preferred type of primary sensing apparatus, the tensioned reed is provided with a plurality of strain gauges spaced apart, generally equidistant one from another, each is provided with leads for the introduction of an electrical input to provide an output signal, or voltage representative of the amount of strain produced in the reed by the energy level changes in the medium when the reed is resonated in harmonic mode. In one embodiment the sum total signal, or voltage, registered by the sum-total of the strain gauges can be converted into a composite number and read by suitable read-out means, or the signal, or voltage, from each of the strain gauges can be separately registered, or recorded, to provide a pattern directly representative of the harmonic mode of the reed.

The characteristics of a preferred primary sensing device, and the principle of its operation, will be more fully understood by reference to the following detailed description, and to the attached drawings to which reference is made in the description. The various features and components in the drawings are referred to by numbers, similar features and components being represented in the different views by similar numbers. Subscripts are used in some instances with numbers where there are duplicate features and components, or to designate a sub-feature or component of a larger assembly.

In the drawings

Figure 1:
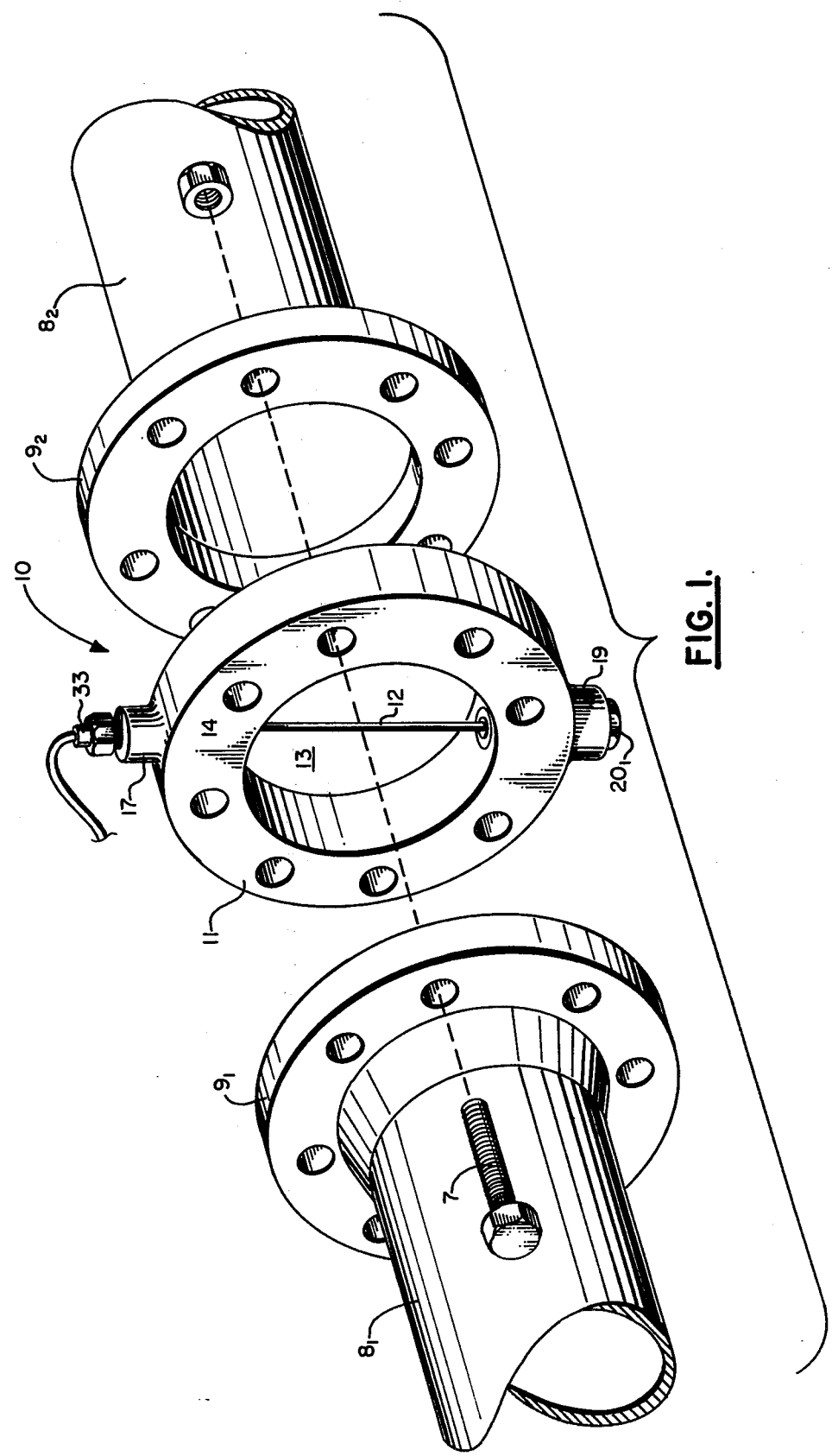
FIG. 1 depicts, in a typical installation within a line or conduit, a perspective view of a preferred primary sensing apparatus, or device, in accordance with this invention, inclusive of a tensed reed and holder.

Referring initially to FIG. 1 there is shown a primary sensing apparatus, or device, 10 as typically installed within a line or conduit. The primary sensing device 10 includes generally a tubular holder, or hollow housing 11, and a tensed, elongated string, band, or reed 12 the two ends of which are affixed and supported from opposite sides of the wall which forms said holder, or housing 11, so that the reed 12 is suspended diametrically across the axial opening 13. The device 10 can be normally installed, e.g., in a pipe or conduit much as in the manner that the common orifice plate is installed. For example, the device 10 can be inserted in a conduit, e.g., as provided by sections of pipe $8_1, 8_2$, between a pair of flanges $9_1, 9_2$, (suitably between gaskets, not shown) which are thereafter bolted together to provide a pressure-tight connection. The bolts 7 which secure the flanges 9 together, if desired, can be passed through the opening $14_1 \ldots 14_n$, and gaskets (not shown) are generally used to aid in securing a suitable pressure-tight fit. In such installation, the housing 11 generally remains completely outside the path of flow of a fluid, fluid impinging upon the relatively narrow forward edge of the reed 12, and flowing along both sides of said reed 12 past its trailing edge. Suitably, if desired, the cross-section of the reed 12 can be varied to provide the desired flow effects, where such factors are relevant to the medium within which the device 10 is employed.

Figure 2:
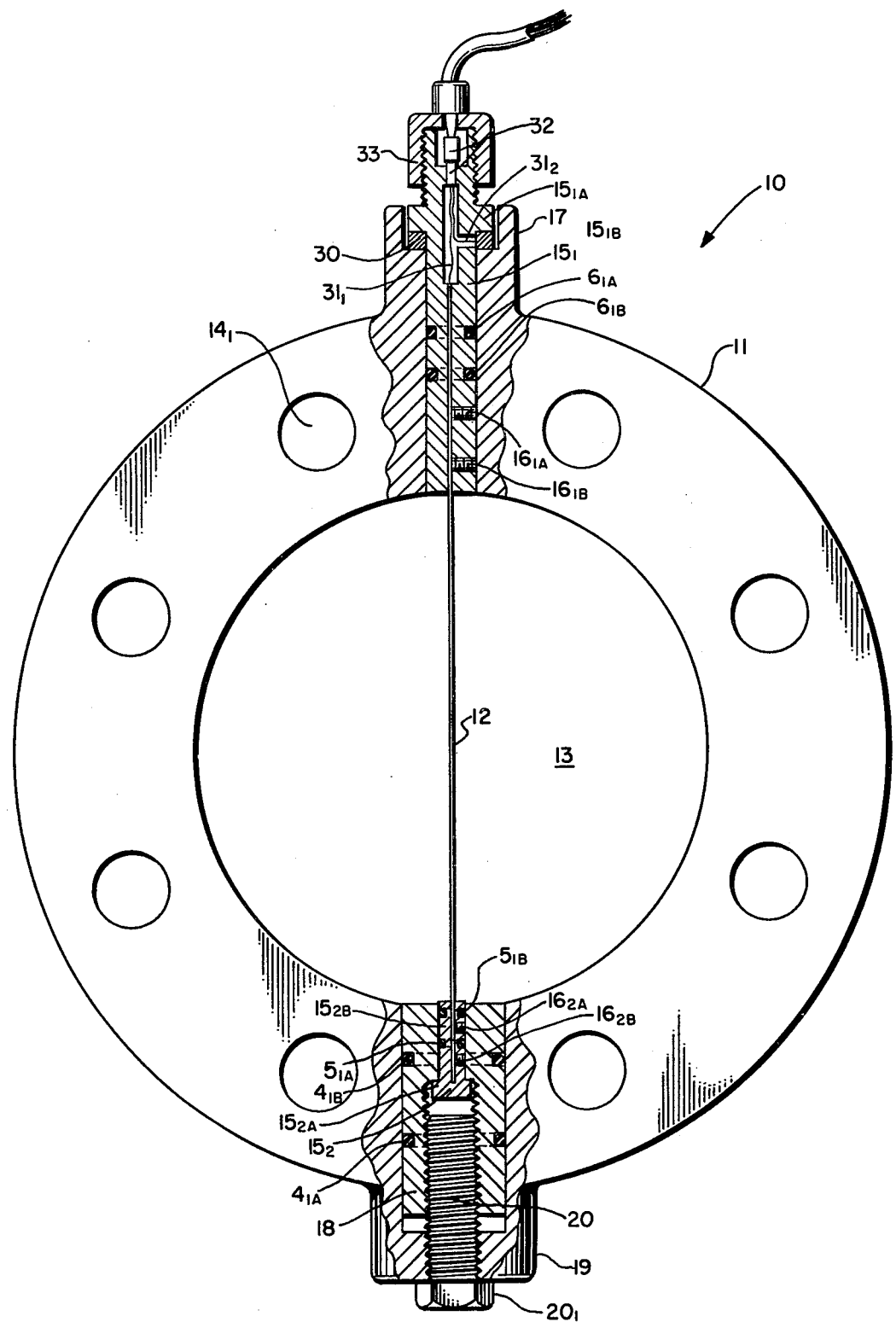
FIG. 2 depicts in partial section a front view of the primary sensing device of this invention, as embodied in the preceding figure.

In use, the reed 12 must be properly tensioned such that on stimulation by the forces exerted by a medium the reed 12 will be caused to vibrate in a harmonic mode. Suitably, referring particularly to FIG. 2, each of the two ends of the reed 12 are provided with attachable caps $15_1, 15_2$, each having a large diameter side $15_{1A}, 15_{2A}$, and a small diameter side $15_{2A}, 15_{2B}$, or neck portion, through which screws $16_{1A}, 16_{1B}, 16_{2A}, 16_{2B}$ are passed to secure the members upon the reed 12. The cap $15_1$, on the one hand, is fitted within the fixed tubular projection 17, located upon the upper side of the housing 11, the cap $15_1$ restraining and preventing inward displacement of the end of said reed 12 by virtue of the large diameter portion thereof which cannot pass through the restricted opening of said projection 17. The cap $15_2$, on the other hand, is fitted within a collar 18 which is adjustable to move inwardly or outwardly to vary the amount of tension placed upon the reed 12. Suitably, the upper end of the movable collar 18 is adapted to retain the enlarged head $15_{2A}$ of cap $15_2$ while the oppositely disposed internally threaded end is engaged to the screw 20, such that the collar 18 is movable within the projecting section 19 of the housing 11. Rotation of the screw 20 by manipulation of the screw head $20_1$, since the screw 20 is not able to move inwardly or outwardly, produces inward or outward movement of the collar 18, as desired, so that the reed 12 can be properly tensioned.

The openings, or passageways, through tubular projections 17 and 19, respectively, are conveniently sealed by means of O-rings. The small diameter side $15_{1B}$ of cap $15_1$ is thus provided with a pair of O-rings $6_{1A}, 6_{1B}$ which are fitted within annular grooves, these effectively sealing off the opening from axial opening 13; and the small diameter side $15_{2B}$ of cap $15_2$ is similarly provided with a pair of O-rings $5_{1A}, 5_{1B}$ fitted within annular grooves cut within the small diameter side $15_{2B}$ of cap $15_2$ which effectively seals off the opening through collar 18 from the axial opening 13. The larger opening contained within projecting section 19, and housing 11, is sealed off from axial opening 13 by O-rings $4_{1A}, 4_{1B}$ contained within annular grooves cut within the external surface of collar 18.

In one embodiment the primary sensing device 10 can be provided with but a single strain gauge, suitably one located in a position which will record and transmit a single composite signal as the energy level of the reed 12 changes, particularly as it changes from one harmonic mode to another as greater and greater amounts of energy are absorbed from the medium. Suitably, a strain gauge 30 can thus be located at the under face between the large diameter side $15_{1A}$ of cap $15_1$ and the shoulder formed by an enlarged opening concentric with the smaller opening through fixed tubular projection 17. Electrical input and output leads $31_1, 31_2$ from the reed 12 and strain gauge 30, respectively, are passed upwardly through a socket 32 to the instrument exterior to read-out means, the socket 32 being contained within an externally threaded projection located at the upper end of cap $15_1$, which in turn is capped with an internally threaded fitting 33, provided with a central opening for the passage of electrical leads therethrough.

Figure 3:
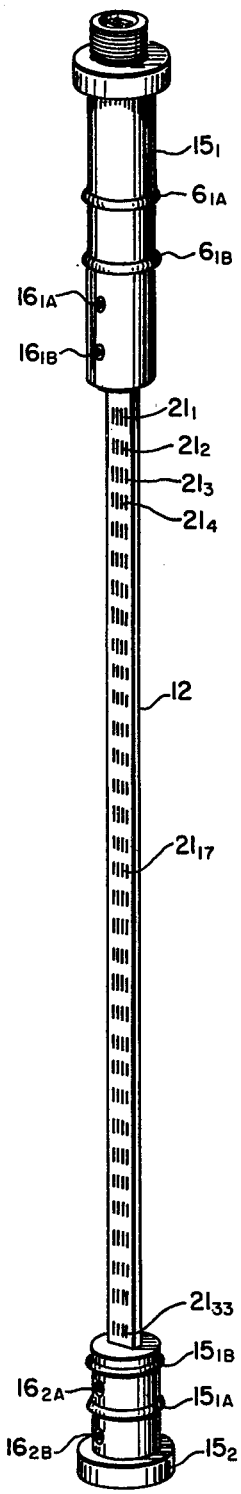
FIG. 3 depicts an enlarged view of a reed per se of preferred type, inclusive of a plurality of strain gauges spaced equidistantly one from another upon a side of said reed.
Figure 4:
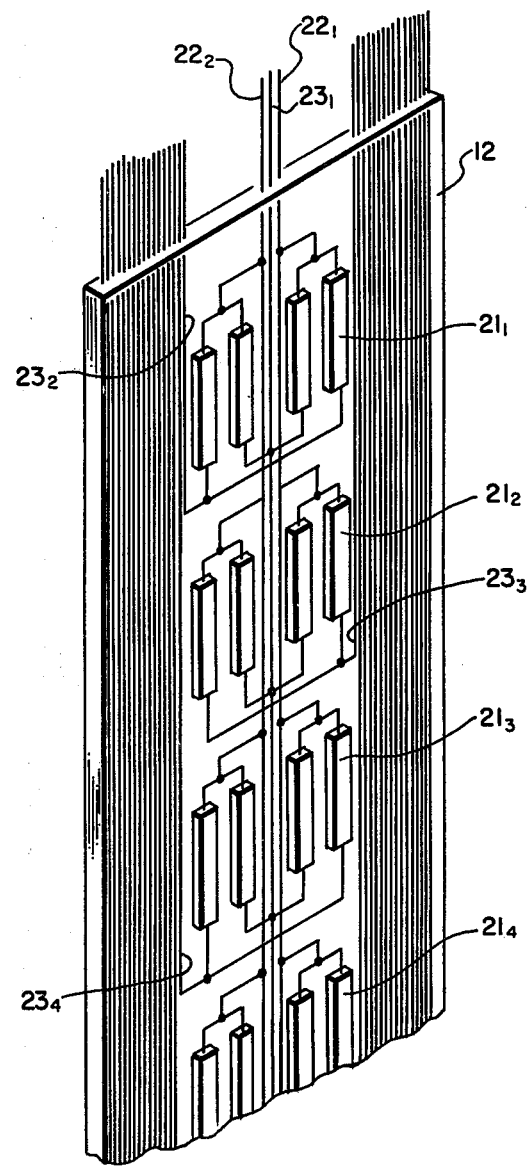
FIG. 4 depicts a fragmentary, and further enlarged, view of a segment of the reed shown in FIG. 3, this view showing in some detail the strain gauges and a portion of the electrical network by virtue of which a condition measured within a medium can be converted into a proportional output voltage.

In another embodiment the primary sensing device 10 can also be provided with a single strain gauge located on the reed 12, at the geometric center of the portion thereof which is vibrated on absorption of energy from the medium. In its more preferred aspects, however, the primary sensing device 10 is one wherein the reed 12, as shown in better detail by specific reference to FIGS. 3 and 4, is provided on one, or both, side thereof with a plurality of strain gauges 21 ($21_1, 21_2, 21_3 \ldots 21_{33}$), each of which is spaced apart, suitably at equal distances one from another, and each is a part of an electrical network suitable for providing an electrical input and output for connection to conventional strain gauge read-out accessories. The strain gauges 21 are generally formed by etching out a small segment of material from the surface of the reed 12 and then forming the strain gauge therein by conventional techniques, as commonly done in the formation of numerous solid state and transistor devices. The electrical input and output leads themselves are etched within the surface of the reed 12 and formed by generally similar techniques, as in the formation of conventional printed circuits.

Referring to FIG. 4, by way of illustration, attention is directed to the series of strain gauges $21_1, 21_2, 21_3, 21_4$. These strain gauges are connected together by common electrical input lines $22_1, 22_2$, line $22_1$ being the negative input and line $22_2$ being the positive input. Line $23_1$ provides a common negative output line, and lines $23_2, 23_3, 23_4$ provide positive output lines for strain gauges $21_1, 21_2, 21_3, 21_4$, respectively. The output voltages from the series of strain gauges are preferably transmitted to read-out accessories which read the voltages individually to provide a pattern which graphically describes the harmonic frequency of the reed 12 when the latter is stimulated and caused to vibrate by the action of various physical phenomena, the transmitted energy from which is periodic in character, e.g., sound waves, flows of liquid such as tides, etc., machine motions, and the like. The harmonic pattern that is produced in reed 12 is directly proportional to the input of the medium which creates the distortion, and the sum-total output voltage, or individual output voltages, that is produced is directly proportional to the harmonic motion produced in the reed 12. The harmonics produced in reed 12 can thus be directly related to the distorting input signal from the medium being measured.

Harmonic motion, or motion wherein a given point of an object sweeps back and forth over the same path, is commonly associated with wave motion. Disturbances produce waves, and waves transmit energy in this fashion along a direction of propagation. When a propagated wave, e.g., sound waves, or waves produced by fluids in motion, encounters the reed 12, some of the energy is absorbed by the reed 12. The reed 12, in turn, is caused to vibrate in direct proportion to the energy transmitted thereto by the disturbing medium to produce a stationary or standing wave within the reed 12. Waves of equal frequency and amplitude thus are caused to travel from one end of the reed 12 to the other, and there are reflected back again, to form nodes at intervals of one-half wave length from each end of the reed, the nodes produced by reflection from both ends of the reed 12 coinciding only for definite wave lengths. Stationary nodes, or points of zero displacement, with intermediate antinodes, or points wherein the waves move back and forth perpendicular to the direction of propagation, are thus set up within the reed 12 in accordance with the laws of harmonics. The excursions of points located on reed 12 at the antinodes move laterally back and forth, the distances increasing as more and more energy is absorbed from the medium until, having reached a maximum, the reed 12 changes to a different harmonic. The condition of any point on reed 12 is, on stimulation, directly related to its harmonic mode, or condition, to the physical characteristics of the reed 12, and to the intensity of the forces transmitted by the disturbing medium. Hence, the harmonic mode of the reed 12 at such condition can be translated into a signal representative of the energy, or change in the amount of energy transmitted by the medium.

Various read-out means for interpretation of the output signals are known. For example, the output signal from a strain gauge can be read by a panel meter, the needle of the instrument reading from 0 to 100 units on a calibrated scale. Output voltages can also be decoded by a microprocessor, e.g., a Motorola 6800 or Irtel 4080 system in normal BCD (binary coded decimal), or digital form, or displayed by the use of Liquid Crystal Display Systems.

Figure 5:
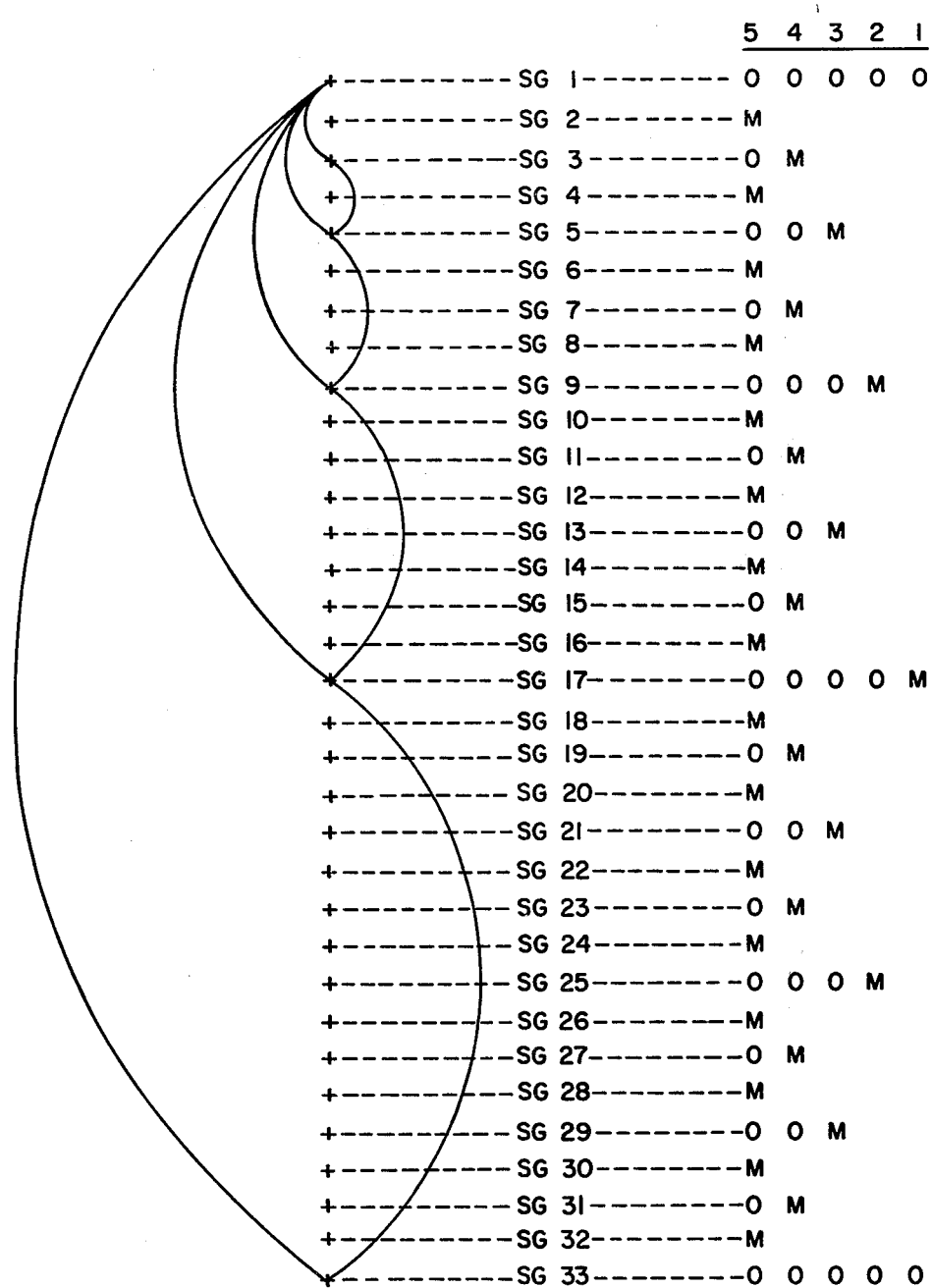
FIG. 5 depicts schematically a segment of the reed in various states of excitation, resonation, or deformation, this figure illustrating in particular the principle of operation of the primary sensing device in the production, measurement, and interpretation of an output signal which is directly related with the stimulation produced by the energy absorbed by the reed from a medium.

Referring to FIG. 5, there is illustrated the principle of operation of the primary sensing device 10. The primary sensing device 10 is depicted in FIG. 5 as installed, e.g., with a fluid carrying conduit within which the rate of flow of a fluid is to be measured and, due to the energy transmitted by the moving fluid to the tensioned reed 12, a harmonic wave pattern is set up within the reed 12. In such mode of operation, it will be apparent that each of the strain gauges 21, if arrayed along the length of the reed 12, will be strained, or deformed, in direct proportion to the applied stress, and that such strain is directly related to the location of a respective strain gauge 21 on the reed 12. Thus, the strain applied at a node will be zero, and the strain at the midpoint of an antinode (or point half-way between adjacent nodes) will be at a maximum which will be directly related to the harmonics. The greater the number of waves produced in the read 12, the lesser will be the distance of excursion of a given point on the reed 12, and consequently the smaller will be the strain which will be measured by a strain gauge 21 placed at the midpoint of an antinode. Conversely, the smaller the number of waves produced in the reed 12, the greater will be the distance of excursion of a given point on the reed 12, and consequently the larger will be the strain which will be measured by a strain gauge 21 placed at the midpoint of an antinode. The greater the number of waves produced in reed 12, the greater will be the number of nodes and antinodes and, conversely, the smaller the number of waves produced in reed 12, the lesser will be the number of nodes and antinodes. There are then several ways in which an output voltage might be read, and interpreted, to provide an indication of the harmonics of the reed 12 under stimulation. The total output voltage of a reed 12 might thus be read by the use of a single strain gauge, and interpreted in terms of its harmonics. Preferably, however, a plurality of readings of output voltages can be taken from a series of strain gauges located along the length of the reed 12 to provide an actual pattern indicative of the harmonic condition of the reed 12, and even this can be cumulated to provide a composite number indicative of the harmonic condition of the reed 12, if desired. This is further illustrated by further direct reference to FIG. 5.

FIG. 5 schematically depicts conditions of a stimulated reed 12, and output voltages such as would be obtained from a series of, e.g., 33 strain gauges 21 (numbered SG #1 through SG #33), located at equal distances apart along the length thereof where readings are desired, in five different modes of stimulation. The straight column of 33 cross marks in the figure represents the location of the strain gauges 21 in a read 12, prior to excitation. The sinosoidal waves drawn about the cross marks represent the locations of different points on a reed 12 in five different states of excitation, or five different harmonic modes. The output voltages received from the different strain gauges 21, for the five different states of excitation, are represented in the five columns on the right side of the figure, the first harmonic being shown in the column farthest to the right, the fifth harmonic in the column farthest to the left, the second, third and fourth harmonic being illustrated by the three columns in between. The values might be representative of negative or positive voltage outputs, for either or both patterns can be obtained. And, of course, the magnitude of the values and pattern are identical except that the values are equal and opposite.

The fundamental, or first, harmonic is the simplest mode of vibration, the two end strain gauges, i.e., SG #1 and SG #33, producing the only nodal points, or points of zero voltage. The maximum voltage (M) is recorded by the center strain gauge, i.e., SG #17. The strain gauges at points in between the center and end strain gauges, on each side of the point of maximum excursion, would provide a series of intermediate voltages. The second harmonic produced by increased stimulation of the reed produces nodes, and consequently locations, of zero voltage at the end strain gauges SG #1 and SG #33, and at the center strain gauge, SG #17. Maximum excursions occur at midpoints between strain gauges SG #1 and SG #17, and strain gauges SG #17 and SG #33, i.e., at strain gauges SG #9 and SG #25. In the third harmonic nodes occur at strain gauges SG #1, SG #9, SG #17, SG #25 and SG #33, with maximum excursions, or voltages, occurring at strain gauges SG #5, SG #13, SG #21, and SG #29. Further stimulation causes the reed to be transformed to the fourth harmonic wherein nodes occur at strain gauges SG #1, SG #5, SG #9, SG #13, SG #17, SG #w1, SG #25, SG #29 and SG #33, with maximum excursions or voltages being produced at strain gauges SG #3, SG #7, SG #11, SG #15, SG #19, SG #23, SG #27 and SG #31. And, in the fifth harmonic, nodes occur at all of the odd-numbered strain gauges, with points of maximum output voltages occurring at all of the even-numbered strain gauges.

It is apparent from this scale of values that the highest output voltage is produced at SG #17 in the first harmonic; the second highest output voltages occur at SG #9 and SG #25 in the second harmonic, the voltage at SG #9 and SG #25 being equal, but one-half that produced in the first harmonic at SG #17; that the output voltages which occur in the third harmonic at SG #5, SG #13, SG #21 and SG #29 are equal, and one-half the maximum output voltage produced in the second harmonic; that the output voltages which occur in the fourth harmonic at SG #3, SG #7, SG #11, SG #15, SG #19, SG #23, SG #27 and SG #31 are equal one to another, and one-half the maximum output voltage produced in the third harmonic; that the output voltages which occur at the fifth harmonic at the even-numbered strain gauges are equal one to another, and one-half the value of the maximum output voltages produced in the fourth harmonic; and that, albeit absolute values are not given nor are the intermediate voltages specifically listed, it is quite apparent tat (1) the pattern of values for any given harmonic differs from that of another, and that (2) the composite voltages for any given harmonic differs from that of another, and that a measurement of either (1) or (2), or both, can be readily employed to define the state of the reed 12 at any level of excitation. The patterns, in particular, present a graphic illustration of the reed 12 at any level of excitation, and provide a convenient scale of values for read-outs taken over any given cross-section of a fluid carrying conduit, and such patterns can be used to indicate different rates of flow along different concentric paths within a conduit wherein a fluid does not flow uniformly.

From the above description, it will now be apparent that the objects of this invention can be readily attained, and although the invention has been described with reference to a particular, though preferred, device, various modifications and variations can be made without departing the spirit and scope of the invention. For example, any device which can produce an output related to the strain, or deformation, produced by or within a specific area, or areas, of the reed, e.g., one which can produce a piezo effect, can be used as a strain gauge. The apparatus can be constructed of materials substantially inert or nonreactive to the chemical or corrosive action of the fluid specimens in which measurements are to be taken. The holder of the apparatus can be constructed of metal, but can be constructed of a plastic or plastic-like material, suitably a semi-rigid, or rigid, form of plastic or plastic-like material. The self-lubricated plastics are especially preferred in this capacity, and can be applied as a laminate or protective film upon a coat of metal or other substrate. The polyfluorinated ethylene polymers, notable among which is polytetrafluoroethylene (Teflon), are particularly useful. Conventional resilient or elastic-like materials, such as natural or synthetic rubbers, can also be employed.

The reeds are preferably constructed of metals, e.g., ferrous metals such as iron, iron alloys, steel, stainless steels, and the like; or such metals as aluminum, magnesium, brass, copper, bronze, chrome, alloys of these and other metals, and the like.

It is apparent that various changes, such as in the absolute or relative dimensions of the parts, materials used, and the like, particularly as relates to the holder and reed, as well as the electronic read-out accessories, as well as the specific application, can be made without departing the spirit and scope of the invention, as will be apparent to those skilled in this art.

Having described the invention, what is claimed is:

1. A primary sensing apparatus for measuring the rate, or changes in the rate of flow of a fluid which comprises
   a tensioned elongated reed capable of resonating in a harmonic mode to produce nodes and antinodes in known relation to the amount of energy transmitted thereto and absorbed from said fluid,
   a support means to which the ends of said elongated reed are affixed and held in tension, and
   a means for sensing the harmonic pattern, and changes as the harmonic pattern shifts from one mode to another.

2. The apparatus of claim 1 wherein the sensing means is comprised of a strain gauge, the strain gauge produces an output signal, and there is incorporated with the apparatus a read-out means for relating and interpreting said output signal in direct relation to changes in the rate of flow of the fluid.

3. The apparatus of claim 1 wherein a strain gauge is located on the reed and employed as a sensing means, and an electrical signal is produced, the output voltage of which is directly proportional to the amount of energy absorbed by the elongated reed, and to changes in the rate of flow of the fluid.

4. The apparatus of claim 1 wherein the sensing means is comprised of a plurality of strain gauges located on the reed, spaced apart one from another, each being provided with leads for the introduction of an electrical input, and an output voltage representative of the amount of strain produced when said elongated reed is resonated in a harmonic mode.

5. The apparatus of claim 4 wherein the output voltage from each of the strain gauges is separately registered to provide a pattern directly representative of the harmonic mode of the elongated reed.

6. The apparatus of claim 1 wherein a single strain gauge is employed as the sensing means and it is positioned to receive, record and transmit a single composite signal as the energy level of the reed changes from one harmonic mode to another as greater and greater amounts of energy are absorbed from said fluid.

7. The apparatus of claim 1 wherein a plurality of strain gauges are located upon said reed and employed as a sensing means, and each is part of an electrical network suitable for providing an electrical input and output for connection to strain gauge read-out accessories.

8. The apparatus of claim 7 wherein the strain gauges and the electrical input and output leads, the latter of which provides means for connection with the strain gauge read-out accessories, are formed in the reed by etching out small segments of material from the surface of the reed.

9. A primary sensing apparatus for measuring the rate, or changes in the rate of flow of a fluid, which comprises a tensioned elongated reed capable of resonating in a harmonic mode to produce nodes and antinodes in known relation to the amount of energy transmitted thereto and absorbed from said fluid, a plurality of strain gauges located upon said elongated reed, spaced apart and substantially equidistant one form another, a support means to which the ends of said elongated reed are affixed and held in tension, and leads associated with each of said strain gauges for connection with strain gauge read-out accessories whereby, on providing an electrical input, a voltage output proportional to the magnitude of the energy transmitted by said fluid to said elongated reed can be detected when the reed is caused to vibrate in a harmonic mode, and resonation of said elongated reed is produced by energy absorbed from said fluid which causes the reed to change from one harmonic to another.

10. The apparatus of claim 9 wherein the support means is formed by an enclosing wall to form a holder of tubular cross-section, and the elongated reed is affixed via suitable means on one wall of the holder, and mounted via means on the opposite of the wall which permit adjustments in the tensioning of the reed.

11. The apparatus of claim 9 wherein the leads, which provide for an electrical input and output from the strain gauge to the strain gauge read out accessories, and the strain gauges are formed by etching out small segments of material from the surface of the reed.

12. The apparatus of claim 9 wherein the support means is formed by an enclosing wall to form a holder of tubular cross section, the elongated reed is affixed by suitable means on one wall of the holder, and mounted by means on the opposite side of the wall which permits adjustments in the tensioning of the reed, and the leads, which provide for an electrical input and output from the strain gauge to the strain gauge read out accessories, and the strain gauges are formed by etching out small segments of material from the surface of the reed.

* * * * *